Nov. 1, 1955     O. T. McILVAINE     2,722,180
FUEL BURNERS
Filed May 12, 1950     2 Sheets-Sheet 2
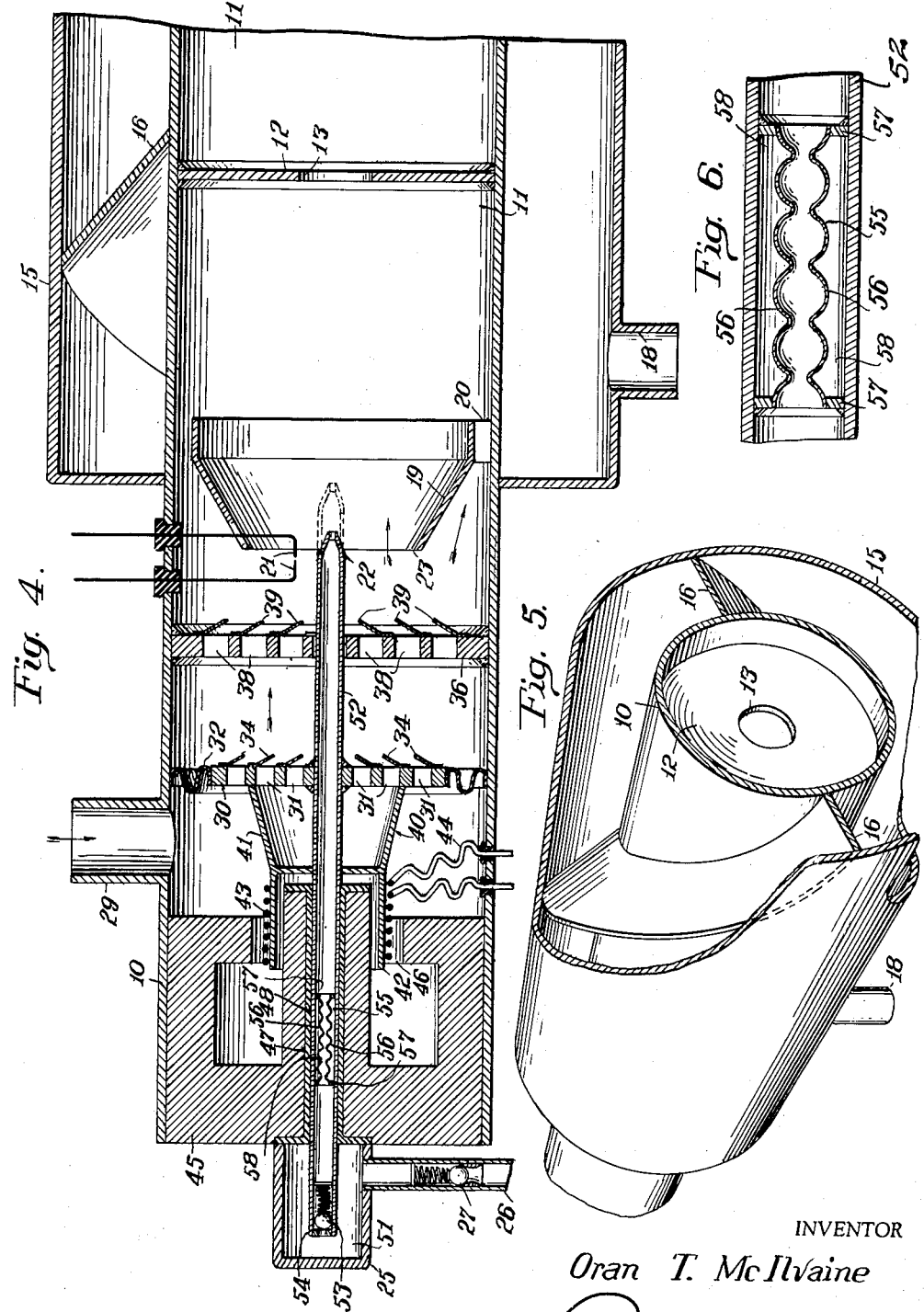
INVENTOR
Oran T. McIlvaine
BY
ATTORNEY

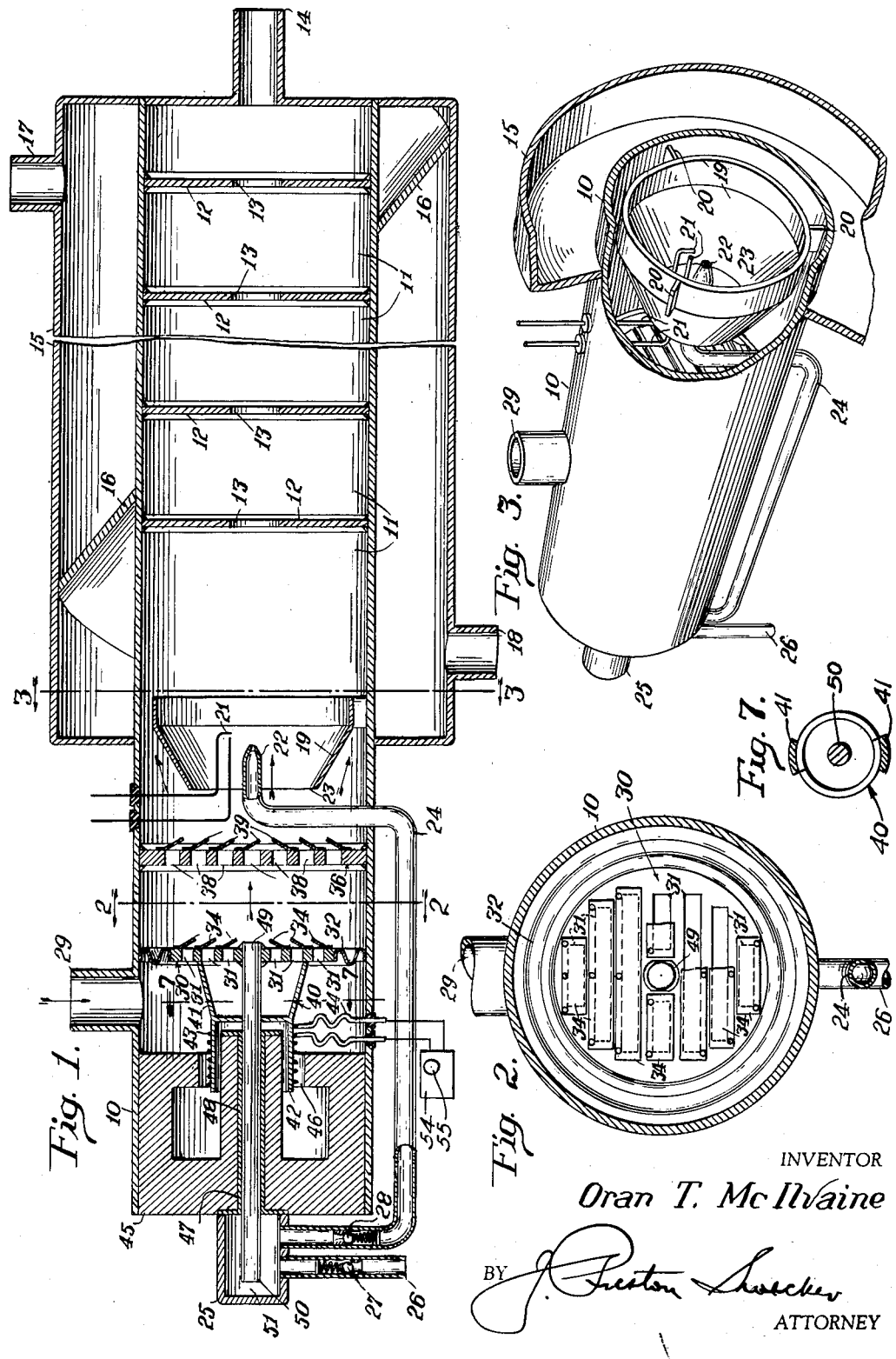

United States Patent Office 2,722,180
Patented Nov. 1, 1955

2,722,180

FUEL BURNERS

Oran T. McIlvaine, St. Charles, Ill.

Application May 12, 1950, Serial No. 161,579

6 Claims. (Cl. 110—1)

This invention relates to a new and improved burner, and more specifically to a burner which utilizes a suitable type of fuel, and which can be used for power production, as in a reaction motor or as applied to a heat exchanger.

Heretofore, it has been difficult to obtain a burner that causes sufficient turbulence of the gases, while burning, to have combustion of high efficiency, and at the same time extract the maximum amount of heat from the burning gases before they go out the stack. In order to accomplish this, it has been necessary to utilize a large combustion chamber with a very long gas passageway. Such burners were of necessity large and bulky and at the best of an overall low efficiency.

One object of this invention is to provide a burner that overcomes these, as well as other, difficulties and which is small and compact and with a very high efficiency.

A further object of this invention is to provide a burner which sets up an oscillation of the incoming air at a controlled frequency and thereby causes the burning gases to scrub against the combustion chamber walls in waves of longitudinal amplitude.

These objects are accomplished by utilizing a new principle, by setting up an oscillation of the burning gases within the combustion chamber.

Other objects and advantages of this invention will become apparent as the discussion proceeds and when taken in conjunction with the accompanying drawings, in which:

Fig. 1 is a longitudinal sectional view of a burner embodying this invention, as applied to a liquid heat exchanger;

Fig. 2 is a cross section taken along the line 2—2 in Fig. 1;

Fig. 3 is a perspective view, partly in section, along the line 3—3 in Fig. 1;

Fig. 4 is a longitudinal sectional view of another form embodying this invention, showing a modified arrangement of the fuel pump;

Fig. 5 is a perspective view of the combustion chamber of the modification shown in Fig. 4, partly in section;

Fig. 6 is a sectional view of the pulsation dampener in the fuel line; and

Fig. 7 is a detailed cross-section on the line 7—7 in Fig. 1.

Turning now to a detailed description of the drawings, the numeral 10 designates a casing or housing, which may be of circular cross section, as shown, but it is understood that it may be of any shape in cross section without deviating from the spirit of my invention. Provided at one end of the housing 10 is a combined combustion and heat exchange chamber 11.

The combustion chamber 11 is provided with a plurality of baffle plates 12 spaced longitudinally therein and provided with orifices or restricted apertures 13 centrally disposed within the baffles. The orifices 13, preferably, should be in longitudinal axial alignment. An exhaust pipe 14 is provided on one end of the combined combustion and heat exchange chamber 11 and, preferably, should be in axial alignment with the restricted apertures or orifices 13.

Surrounding the chamber 11 and securely affixed to the casing or housing 10 is a fluid tight jacket 15 provided with a baffle 16 therein, preferably in the form of a helix or convolution and extending substantially the length of the chamber 15. Fluid inlets 17 and 18 are provided in the jacket 15, as shown in Fig. 1.

Located within the chamber 11 and disposed intermediate the ends of the housing 10 is a truncated cone 19 held in inwardly spaced relation within the combined combustion and heat exchange chamber 11 by means of radial spacers 20 or the like, interposed between the periphery of the cone and the inner wall of the housing 10.

A conventional fuel igniting means 21 is provided within the cone 19, as shown, for the purpose of igniting the fuel as it is ejected from a fuel nozzle 22. The fuel igniting means may be of any type desired and is here represented as of the spark gap type.

The fuel nozzle 22 may be of conventional design and is adapted to operate on either liquid or gaseous fuel. The nozzle 22 extends into the cone 19 through a throat or opening 23 provided in the small end of the cone.

A fuel pipe 24 is connected to the nozzle 22 at one end and at the opposite end is connected to a pump 25, details of which will be described later. Fuel is admitted to the pump by means of an inlet pipe 26. Located in the fuel inlet pipe 26 is a check valve 27, and in the fuel pipe 24 is a second check valve 28. The check valves 27 and 28 may be of conventional design but are here shown to be of the spring-loaded, ball-seat type.

Air is admitted into the housing 10 by means of a conduit 29, and is forced into the chamber 11 by means of a novel and unique system. This system comprises a vibrating diaphragm or plate 30 provided with a plurality of elongated apertures or ports 31 therein, as best shown in Figs. 1 and 2.

The plate 30 is of the same cross-sectional shape as the housing 10, but somewhat smaller in size. This plate is suspended therein by means of a flexible member 32, as best shown in Figs. 1 and 2. The member 32 entirely surrounds the plate 30 and is attached at its periphery to the inner wall of the housing 10 and around its inner edge to the plate 30, as by spot welding or the like. The member 32, preferably, should be of metal which yields readily and has a high resistance to heat, such as beryllium copper or the like, but may also be of some suitable plastic. The plate 30 may likewise be made as a tight fitting piston either with or without rings, working within housing 10 serving as a cylinder. It is not imperative that the connection between the housing 10 and the plate 30 be in the form of a seal, as the operation of the plate 30 is more dynamic than static.

Riveted or spot welded along one edge over each of the ports 31 is a flap or check valve 34. Each of these valves 34 consists of a very thin metallic sheet, such as beryllium copper, "neoprene" or other synthetic or suitable material. The valves 34 normally remain in a closed position covering the ports 31, due to the inherent tension of the material, but due to their extreme thinness are sufficiently flexible so as to move into an open position as shown in Fig. 1, when air moves in a direction indicated by the arrows from the air inlet pipe 29 toward the cone 19.

Spaced apart from the vibrating diaphragm or plate 30 but also within the housing 10 and disposed between the plate 30 and the cone 19, is a stationary plate 36, which is welded or otherwise secured solidly to the inside of the housing 10. The plate 36 is similar to the plate 30 and is provided with a plurality of elongated apertures or ports 38, as shown in Fig. 1. Covering each of the ports 38 is a flap or check valve 39 which is riveted or spot welded to the plate 36 in the same manner that the valves 34 are affixed to the plate 30. The valves 39 are also of similar construction and material to the valves 34 and, because of the inherent tension of the material, normally remain closed over the ports. These valves are in the open position shown in Fig. 1, only when air actually is moving therethrough, as indicated by the arrows.

Rigidly mounted on the plate 30 is a bracket 40 which, preferably, should consist of spaced arms 41, see Fig. 7, as small as possible so as not to obstruct the flow of air passing through the elongated ports 31 in the center portion of the plate 30. Upon the bracket 40 is mounted a tubular member 42 around which a coil of wire 43 is wound, as shown. The coil of wire 43 is connected to lead wires 44, which in turn are connected to an electrical oscillation circuit to be described later. A magnet 45 is provided in the housing 10, as shown in Fig. 1, producing a magnetic field within which the coil 43 is located. An opening 46 is provided in one end of the magnet 45, as shown, and freely receives therein the tubular member 42 around which the coil 43 is wound, the walls of which opening 46 are spaced apart from the coil 43.

A second opening 47 is provided through the magnet 45 and in this opening is mounted a bushing 48. A piston rod 49 is rigidly attached at one end to the plate 30 and is slidably inserted through the bushing 48. One end 50 of the piston rod 49 extends into a chamber 51 of the pump 25. The bushing 48 should be of a friction type bushing bearing sufficiently tight around the rod 49 to prevent leakage of fuel therealong but should permit seepage of a small amount of oil for the purpose of lubrication therein.

The operation of this form of the invention may be described briefly as follows: An electric oscillator provides current to the coil 43 by means of connections 44. This oscillator current may be from an ordinary 60-cycle line, or preferably can be of a tube-type oscillator 54 having its frequency manually controlled at 55. The range of frequency of the oscillator may vary for different types of fuel, different circumstances and different demands made upon the burner. In many cases frequencies of super-sonic range may be desired, and the particular type of oscillator supplying current to the coil 43 in all cases would govern. Inasmuch as there are many types of oscillators now on the market which would serve equally as well for the purpose intended, no specific showing of such an oscillator is made.

When an oscillating current is passed through coil 43, this will set up a vibration of the tubular member 42, which in turn will be translated to the plate 30, thereby causing the plate 30 to vibrate axially within the housing 10. As the plate 30 is caused to move toward the combined combustion and heat exchange chamber 11 in its cycle of vibration, the valves 34 will be closed and air will be sucked into the space between the plate 30 and the magnet 45. At this same time the air will be forced out of the space between plates 30 and 36 and through the ports 38, with the valves 39 being in an open position. This will force air into the chamber 11.

Air passes into the chamber 11 in two paths: one through the opening 23 in the cone 19, and the other around the outside walls of cone 19 between the spacers 20. Combustion will take place within the cone 19 just beyond the terminus of the fuel nozzle 22, but because of the flow of air around the outside of the cone 19 the cone will be cooled and combustion immediately around the outside of the cone will be prevented. Furthermore, as the air moves around the outside of the cone 19 it travels along the inside wall of the combustion chamber 11, thus cooling the gases in this zone and preventing complete combustion of the burning gases until they have moved substantially away from cone 19.

As the plate 30 is caused to move in its cycle of vibration in a direction away from the cone 19, valves 34 will be drawn open and valves 39 closed. Thus, air will be drawn into the space between plates 30 and 36 until the extreme limit of travel of the plate 30 is reached, when again the cycle is repeated.

Thus, it will be seen that air and fuel are forced into the chamber 11 in pulsations of a frequency determined by the oscillator supplying current to the coil 43. The introduction of air into the chamber 11 under pulsations will cause the burning gases to vibrate longitudinally therein and thus "scrub" the heating surfaces in a longitudinal motion within the chamber.

The baffle plates 12 further accelerate the scrubbing action of the burning gases by virtue of the fact that they cause the direction of movement thereof to change approximately 90 degrees every time a baffle plate is reached. As the hot gases pass the length of the combined combustion and heat exchange chamber 11, they are forced through the restricted openings or orifices 13. This will cause a change in velocity of the gases in the chamber and again a further scrubbing action will take place along the baffles 12, as well as the inside wall of the chamber 11. This process is repeated through each successive baffle 12 until the maximum utility of the heat of the burned gases is obtained and the products of combustion are exhausted through the opening 14.

As the plate 30 is caused to vibrate by the coil 43, the piston rod 49 is also caused to slide longitudinally within the bushing 48, and the end 50 of the piston acts as a pump in the chamber 51, drawing fluid into the chamber on one stroke and forcing it out of the chamber through line 24 on the return stroke. This pumps fuel from the reservoir to the nozzle 22.

The combustion that takes place in the chamber 11 heats the fluid being circulated through the jacket 15, thereby utilizing the heat of the burner for heating such fluid, either air or water or other fluid.

Turning now to a detailed description of another form of burner embodying this invention, shown in detail in Fig. 4, the housing 10, combined combustion and heat exchange chamber 11, baffles 12, cone 19, plates 30 and 36, magnet 45 and coil 43 are the same in both forms. The piston rod 49 is replaced by a tubular conduit 52 which carries the fuel nozzle 22 thereon. The tubular conduit 52 is affixed to plate 30 and extends therethrough, as shown in Fig. 4. Conduit 52 also slidably extends through a suitable opening provided in plate 36 and carries nozzle 22 thereon, as shown. The tubular conduit 52 is provided with a spring-loaded check valve 53. The end of the tubular conduit 52 opposite the nozzle 22 forms a piston 54. As the piston 54 reciprocates within the chamber 51 of the pump 25, it pumps fluid through the conduit 52 to the nozzle 22, due to the displacement of fluid in the chamber 51.

Fuel enters the pump housing 25 by means of conduit 26.

Disposed intermediate the ends of the tubular conduit 52 is a pulsation dampener 55 which is provided to smooth out the pulsations in the fluid flow caused by the piston 54. The pulsation dampener 55 is in the form of a fluted or corrugated "Sylphon" type of bellows 56 affixed at both ends to the conduit 52 by means of plates 57, shown in detail in Fig. 6. The "Slyphon" bellows 56 expands in the space 58 between the end plates 57 within the conduit 52. This space is sealed off from the remainder of the hollow portion of the inside of the conduit and may, if preferred, be open to the atmosphere. It is also to be understood here that the same type of vibration dampener may be provided in the tubular member 24 between the nozzle 22 and the check valve 28 of Fig. 1, if desired.

The operation of this form of burner is identical with that shown in Fig. 1, with the exception that the nozzle 22 vibrates with the plate 30, as indicated by the dotted lines. The principal of operation of both the burners of Figs. 1 and 4 may be described as an oscillator controlled air wave producer, with the wave-producing means also serving as the source of energy for the operation of a piston pump. Since the air and fuel are pumped into the combustion chamber from the same unit and source of energy, an exact mixture of fuel and air is attained for any volume of heat, and is positively controlled by the frequency set up in the coil 43. Inasmuch as the action of the plunger 49 and the tubular conduit 52 in the pump chamber 51 is the full equivalent of a hydraulic piston, pressures of any amount can be produced. This pressure is regulated by the size of the nozzle opening and, as has been stated above, fluctuations in the feeding of the fuel through the nozzle are dampened by means of the pulsation dampener 55.

Extremely high pressures of the fuel can be produced and, together with the high frequency of the air flow, a very combustible mixture is formed. The invention is described in connection with apparatus for using liquid fuel, although with suitable modifications of the pump means, it may operate on either gaseous fuel or even powdered solid fuel.

When the oscillator connected with the coil 43, or otherwise acting on the vibrating plate 30, is operated at resonant frequency or harmonic of resonant frequency with the combustion chamber, a great saving in operating power is derived and a tremendous increase in gas activity is experienced.

It is to be understood that modifications and changes in materials and structural details may be resorted to without deviating from the spirit of this invention.

I claim:

1. In a fuel burner, in combination with wall means defining a longitudinally extending combustion chamber having an inlet end, and means for feeding fuel to said combustion chamber, of means in direct communication with said inlet end of the combustion chamber for supplying pulsations of air axially directly thereto and comprising a diaphragm plate, and magnetic means for actuating said plate including means forming a magnetic field, a coil in said magnetic field, means supporting the coil in rigid relation to and connected with the plate, and an electric oscillator connected with the coil.

2. In a fuel burner, in combination with wall means defining a longitudinally extending combustion chamber having an inlet end, and means for feeding fuel to said combustion chamber, of means in direct communication with said inlet end of the combustion chamber for supplying pulsations of air axially directly thereto and comprising a diaphragm plate having one-way valve means connected therewith and arranged for supplying air therethrough to the combustion chamber, and magnetic means for actuating said plate including means forming a magnetic field, a coil in said magnetic field, means supporting the coil in rigid relation to and connected with the plate, and an electric oscillator connected with the coil.

3. In a fuel burner, the combination with wall means defining a longitudinally extending combustion chamber having an inlet end, and means for feeding fuel to said combustion chamber, of means in direct communication with said inlet end of said combustion chamber for supplying pulsations of primary air axially directly thereto and comprising a diaphragm plate, means mounting said plate for vibrating movement, means forming a plurality of one-way valved openings through the plate in the direction of the combustion chamber for supplying air therethrough to said combustion chamber, and magnetic means for actuating said plate including means forming a magnetic field, a coil in said magnetic field, means supporting the coil in rigid relation to and connected with the plate, and an electric oscillator connected with the coil.

4. In a fuel burner, the combination with wall means defining a longitudinally extending combustion chamber having an inlet end, and means for feeding fuel to said combustion chamber, of means in direct communication with said inlet end of said combustion chamber for supplying pulsations of primary air axially directly thereto and comprising a diaphragm plate, means mounting said plate for vibrating movement, means forming a plurality of one-way valved openings through the plate in the direction of the combustion chamber for supplying air therethrough to said combustion chamber, magnetic means for actuating said plate including means forming a magnetic field, a coil in said magnetic field, means supporting the coil in rigid relation to and connected with the plate, and an electric oscillator connected with the coil, a second plate intermediate the diaphragm plate and the inlet end of the combustion chamber, and means forming one-way valved openings through said second plate for flow of air therethrough in the direction of the combustion chamber.

5. In a fuel burner, the combination with wall means defining a longitudinally extending combustion chamber having an inlet end, and means for feeding fuel to said combustion chamber, of means in direct communication with said inlet end of said combustion chamber for supplying pulsations of primary air axially directly thereto and comprising a diaphragm plate, means mounting said plate for vibrating movement, means forming a plurality of one-way valved openings through the plate in the direction of the combustion chamber for supplying air therethrough to said combustion chamber, and magnetic means for actuating said plate including means forming a magnetic field, a coil in said magnetic field, means supporting the coil in rigid relation to and connected with the plate, and an electric oscillator connected with the coil, said fuel feeding means being connected with the diaphragm plate and operating with the flow of air therethrough.

6. In a fuel burner, the combination with wall means defining a longitudinally extending combustion chamber having an inlet end, and means for feeding fuel to said combustion chamber, of means in direct communication with said inlet end of said combustion chamber for supplying pulsations of primary air axially directly thereto and comprising a diaphragm plate, means mounting said plate for vibrating movement, means forming a plurality of one-way valved openings through the plate in the direction of the combustion chamber for supplying air therethrough to said combustion chamber, and magnetic means for actuating said plate including means forming a magnetic field, a coil in said magnetic field, means supporting the coil in rigid relation to and connected with the plate, an electric oscillator connected with the coil, and means for adjusting the electric oscillator to vary the pulsations of air to the combustion chamber.

References Cited in the file of this patent

UNITED STATES PATENTS

| Number | Name | Date |
|---|---|---|
| 62,953 | Hafer | Mar. 19, 1867 |
| 1,137,328 | Jennings | Apr. 27, 1915 |
| 1,249,654 | Muller | Dec. 11, 1917 |
| 1,333,229 | Toles | Mar. 9, 1920 |
| 1,490,267 | Greenwood | Apr. 15, 1924 |
| 1,613,615 | Lippert | Jan. 11, 1927 |
| 1,640,317 | Haas et al. | Aug. 23, 1927 |
| 1,844,772 | La Pointe | Feb. 9, 1932 |
| 1,861,014 | Howard | May 31, 1932 |
| 1,912,243 | Andrews | May 30, 1933 |
| 2,029,374 | Houston | Feb. 4, 1936 |
| 2,061,869 | Gilbert et al. | Nov. 24, 1936 |
| 2,142,329 | Nika et al. | Jan. 3, 1939 |
| 2,204,226 | Nelson | June 11, 1940 |
| 2,293,684 | Holthouse | Aug. 18, 1942 |
| 2,322,913 | Best et al. | June 29, 1943 |
| 2,414,828 | McCollum | Jan. 28, 1947 |
| 2,459,575 | Neumann et al. | Jan. 18, 1949 |
| 2,471,832 | McCollum | May 31, 1949 |
| 2,481,620 | Rosenthal | Sept. 13, 1949 |
| 2,523,308 | Kemmer et al. | Sept. 26, 1950 |
| 2,581,902 | Bodine | Jan. 8, 1952 |
| 2,664,702 | Lloyd et al. | Jan. 5, 1954 |